US007169920B2

United States Patent
Lin et al.

(10) Patent No.: US 7,169,920 B2
(45) Date of Patent: Jan. 30, 2007

(54) PHOTORECEPTORS

(75) Inventors: Liang-Bih Lin, Rochester, NY (US); John S. Chambers, Rochester, NY (US); Jin Wu, Webster, NY (US); Francisco José López, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 110 days.

(21) Appl. No.: 11/112,318

(22) Filed: Apr. 22, 2005

(65) Prior Publication Data

US 2006/0236893 A1 Oct. 26, 2006

(51) Int. Cl.
*C09B 47/04* (2006.01)

(52) U.S. Cl. ............... 540/138; 540/140; 540/141; 430/76

(58) Field of Classification Search ........... 540/141, 540/140, 142, 143, 138, 139; 430/58, 59, 430/76
See application file for complete search history.

(56) References Cited

U.S. PATENT DOCUMENTS

| 4,265,990 | A | 5/1981 | Stolka et al. |
|---|---|---|---|
| 4,346,158 | A | 8/1982 | Pai et al. |
| 4,654,284 | A | 3/1987 | Yu et al. |
| 4,898,799 | A | 2/1990 | Fujimaki et al. |
| 5,153,313 | A * | 10/1992 | Kazmaier et al. ........... 540/138 |
| 5,206,359 | A * | 4/1993 | Mayo et al. ................ 540/141 |
| 5,473,064 | A | 12/1995 | Mayo et al. |
| 5,521,306 | A | 5/1996 | Burt et al. |
| 6,476,219 | B1 | 11/2002 | Duff et al. |
| 6,492,080 | B1 | 12/2002 | Burt et al. |
| 6,790,573 | B2 | 9/2004 | Drappel et al. |
| 6,800,411 | B2 | 10/2004 | Tong et al. |
| 6,818,366 | B2 | 11/2004 | Qi et al. |
| 6,824,940 | B2 | 11/2004 | Wu et al. |
| 2004/0115546 | A1 | 6/2004 | Tong et al. |

* cited by examiner

*Primary Examiner*—James O. Wilson
*Assistant Examiner*—Paul V. Ward
(74) *Attorney, Agent, or Firm*—Carter DeLuca Farrell & Schmidt LLP

(57) ABSTRACT

Methods for preparing phthalocyanine co-crystals are provided. The phthalocyanine co-crystals include titanyl phthalocyanines and metal free phthalocyanines.

18 Claims, 2 Drawing Sheets

PHOTORECEPTORS

BACKGROUND

The present disclosure relates to phthalocyanine pigments for use in photoreceptors, and more particularly to co-crystals of metal phthalocyanines, such as titanyl phthalocyanine, with metal free phthalocyanines.

Phthalocyanine pigments are currently utilized in a number of photoreceptors. Two pigments in use include titanyl phthalocyanine (TiOPC) and hydroxygallium phthalocyanine (HOGaPC). Both are fairly sensitive, depending on their morphology and methods utilized for their preparation A very sensitive TiOPC has a collection efficiency of about 85%, while the most sensitive HOGaPC has a collection efficiency of about 60% to about 70%.

Methods for producing and utilizing such pigments are known. In U.S. Pat. No. 4,898,799, the entire disclosure of which is incorporated herein by reference, there is disclosed, for example, the preparation of selected polymorphs of titanium phthalocyanines, and layered photoconductive members comprised of the prepared phthalocyanine composites. In U.S. Pat. No. 5,153,313, the entire disclosure of which is incorporated herein by reference, there is disclosed, for example, a process for the preparation of composites of titanyl phthalocyanines and vanadyl phthalocyanines by suspending the vanadyl phthalocyanine in a solvent mixture of trifluoroacetic acid and methylene chloride, adding titanyl phthalocyanine to the stirring mixture, and thereafter precipitating the desired titanyl phthalocyanine and vanadyl phthalocyanine composite. The resulting phthalocyanine composite may be utilized as a pigment for a photoreceptor.

Pigments having excellent photosensitivity, processes for their preparation, and their use in forming photoreceptors remain desirable.

SUMMARY

The present disclosure provides methods for the preparation of phthalocyanine co-crystals. The methods include adding a metal phthalocyanine and a metal free phthalocyanine to a solvent to form a co-crystal solution and recovering the phthalocyanine co-crystal. In embodiments, the co-crystal solution may be added to a non-solvent which enables the precipitation of the phthalocyanine co-crystals. In embodiments, co-crystal refers, for example, to a crystal complex of metal and metal free phthalocyanine at a weight ratio of metal phthalocyanine to metal free phthalocyanine from about 99:1 to about 10:90, in embodiments from about 95:5 to about 50:50.

Suitable metal phthalocyanines include titanyl phthalocyanine, hydroxygallium phthalocyanine, cholorogallium phthalocyanine and zirconyl phthalocyanine. In embodiments, the phthalocyanine co-crystals may be converted to a photosensitive pigment by adding the phthalocyanine co-crystals to an aromatic solvent such as, for example, aromatic hydrocarbons, aromatic nitro compounds, aromatic halogen compounds, and phenols.

Phthalocyanine co-crystals produced by these methods are also provided.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

Figure 1:
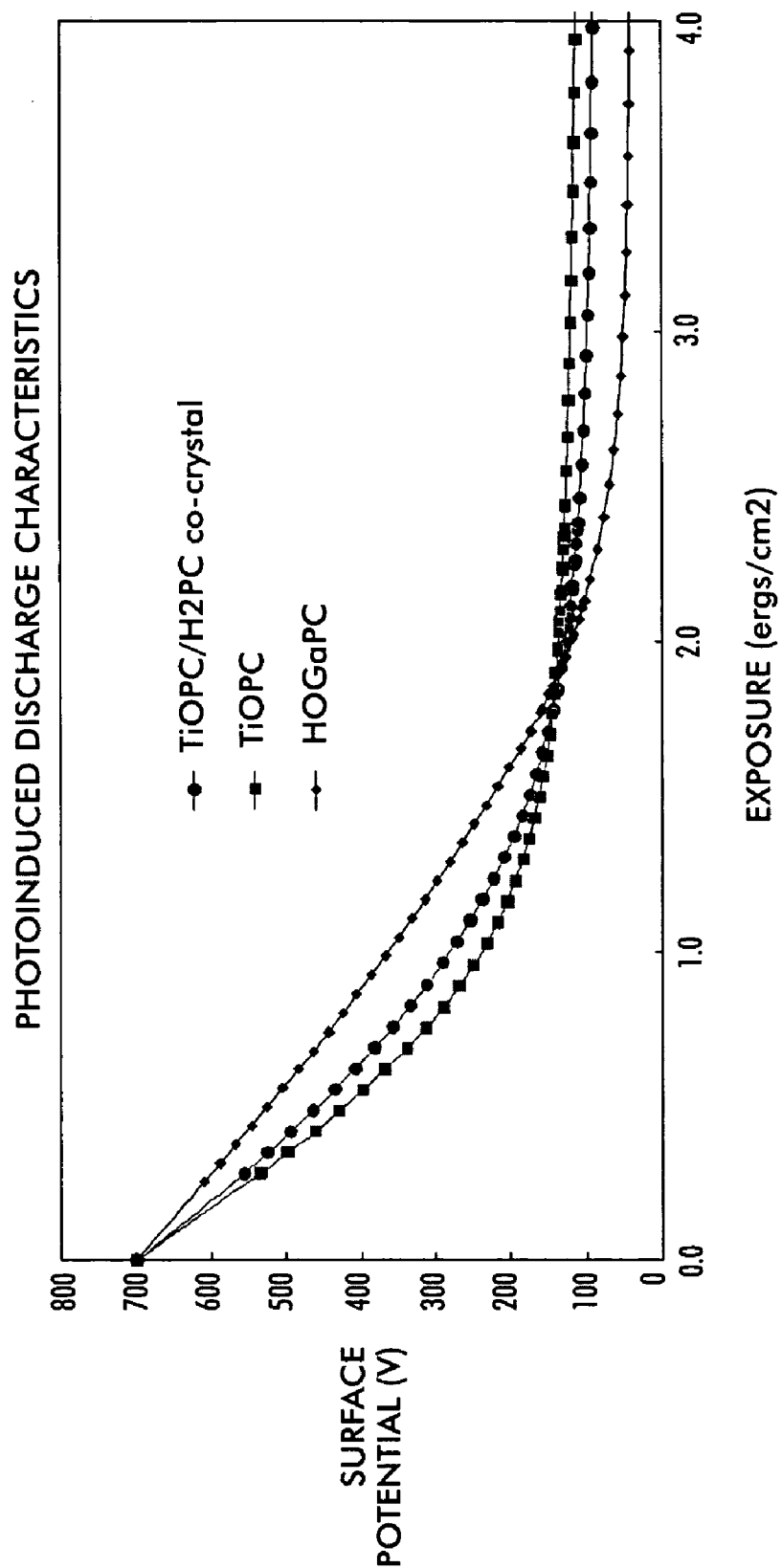
FIG. 1 is a graph depicting the photoinduced discharge characteristic (PIDC) curves of photoreceptor devices prepared with a TiOPC/$H_2$PC phthalocyanine co-crystal pigment of the present disclosure compared with photoreceptor devices having HOGaPC and TiOPC, respectively, as pigment.

The present disclosure provides a pigment prepared by the co-crystallization of a metal phthalocyanine and a metal free phthalocyanine ($H_2$PC). The method of the present disclosure includes dissolving crude pigments of metal phthalocyanine and $H_2$PC followed by a series of quenching and washing steps to produce the phthalocyanine co-crystals. In embodiments, co-crystal refers, for example, to a co-crystalline complex of metal phthalocyanine and metal free phthalocyanine produced by the methods disclosed herein wherein the weight ratio of metal phthalocyanine to metal free phthalocyanine is from about 99:1 to about 10:90, in embodiments from about 95:5 to about 50:50. Photoresponsive imaging members utilizing these phthalocyanine co-crystal pigments are also provided.

Suitable metal phthalocyanines which may be utilized to form the co-crystal pigments of the present disclosure include, for example, titanyl phthalocyanine (TiOPC), hydroxygallium phthalocyanine, cholorogallium phthalocyanine and/or zirconyl phthalocyanine. Titanyl phthalocyanines which may be utilized to form the co-crystal pigments of the present disclosure include, for example, titanyl phthalocyanines obtained from the reaction of diiminoisoindoline and titanium alkoxide (such as titanium tetrabutoxide), or phthalocyanine and titanium tetrachloride, in an organic solvent. In embodiments, suitable titanyl phthalocyanines may be synthesized by the reaction between titanium tetra (propoxide) with a mixture of phthalonitrile and diiminoisoindolene in N-methylpyrrolidinone solvent to provide Type I or β Type titanyl phthalocyanine as determined by X-ray powder diffraction (XRPD). In embodiments, the titanyl phthalocyanine may be the Y form, Type I, α Type or β Type.

Hydroxygallium phthalocyanines (HOGaPc) which may be utilized as the metal phthalocyanine are known. U.S. Pat. Nos. 5,521,306 and 5,473,064, the entire disclosures of each of which are incorporated by reference herein, describe HOGaPc and processes to prepare Type V hydroxygallium phthalocyanine.

Chlorogallium phthalocyanines which may be used include, for example, the Type II chlorogallium phthalocyanines disclosed in U.S. Pat. No. 6,492,080, the entire disclosure of which is incorporated by reference herein.

The metal phthalocyanine has a particle size ranging from about 150 nm to about 350 nm, in embodiments from about 200 nm to about 300 nm.

Metal free phthalocyanines which may be utilized to form the co-crystal pigment of the present disclosure may be obtained by various methods including, for example, by refluxing phthalonitrile with ammonia gas in 2-N,N-dimethylaminoethanol or by the condensation of phthalonitrile in hydroquinone solvent.

Other methods for producing metal free phthalocyanines include those disclosed in U.S. Pat. No. 6,476,219, the disclosure of which is incorporated by reference herein. In some embodiments, metal-free phthalocyanine can be prepared by treatment of an alkali metal phthalocyanine such as dilithium, disodium, dipotassium, beryllium, magnesium, or calcium phthalocyanine, with a dilute aqueous or alcoholic acid. Examples of suitable acids include, but are not limited to, hydrochloric acid, phosphoric acid, sulfuric acid, nitric acid, and sulfonic acids such as alkylsulfonic, arylsulfonic, arylalkylsulfonic, and alkylarylsulfonic, wherein the alkyl portions thereof can be linear or branched, in one embodiment with from about 1 to about 18 carbon atoms, although the number of carbon atoms can be outside of this range, and wherein the aryl portions thereof in one embodiment have from about 6 to about 12 carbon atoms, although the number of carbon atoms can be outside of this range. Other acids which may be utilized include carboxylic acids, such as alkylcarboxylic, arylcarboxylic, arylalkylcarboxylic, and alkylarylcarboxylic, wherein the alkyl portions thereof can be linear or branched, and wherein the carboxylic acid in one embodiment can have from about 1 to about 24 carbon atoms, although the number of carbon atoms can be outside of this range in the case of, for example, formic, acetic, propionic and benzoic acids and the like, as well as mixtures thereof.

The acid is present in a water or alcohol solution in any desired or effective concentration. Examples of suitable alcohols which may be used include, but are not limited to, methanol, ethanol, propanol, isopropanol, ethylene glycol, and the like, as well as mixtures thereof. In one embodiment, the acid may be present in the solution in an amount ranging from about 1 percent by weight acid to about 10 percent by weight acid, in embodiments from about 2 percent by weight acid to about 5 percent by weight acid, although the acid concentration can be outside of these ranges.

Alternatively, the metal-free phthalocyanine can be prepared by heating a concentrated solution of 4-(3-pentadecyl) phenoxyphthalonitrile in a dialkyl monoalkanolamine solvent, wherein the alkyl groups, which can be connected to the nitrogen atom through a primary, secondary, or tertiary carbon atom, in one embodiment have from about 1 to about 6 carbon atoms, and in another embodiment have from about 1 to about 3 carbon atoms, although the number of carbon atoms can be outside of these ranges. Suitable alkyl groups in the dialkyl monoalkanolamine solvent include, but are not limited to, methyl, ethyl, n-propyl, isopropyl, and the like. The alkanol groups can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges. Suitable alkanol groups include, but are not limited to, 2-hydroxyethyl, 2-hydroxypropyl, 3-hydroxypropyl, and the like. Specific examples of suitable dialkyl monoalkanolamine solvents include 2-dimethylaminoethanol, 2-diethylaminoethanol, 2-dimethylamino-1-propanol, and the like, as well as mixtures thereof.

In embodiments, the metal free phthalocyanine may be the X-form of metal free phthalocyanine. The metal free phthalocyanine has a particle size ranging from about 100 nm to about 300 nm, in embodiments from about 150 nm to about 250 nm.

The metal phthalocyanine and the metal free phthalocyanaine are combined in a solvent to form the co-crystal pigments of the present disclosure. The ratio of metal phthalocyanine to metal free phthalocyanine may range from about 99:1 to about 10:90 by weight, in embodiments from about 95:5 to about 50:50 by weight. Solvents which may be utilized include, for example, protonic acids, aromatic solvents, ethers, pyrrolidinones, alkyl halides, alkylene halides, and mixtures thereof. Specific solvents which may be utilized include, for example, trifluoroacetic acid, toluene, tetrahydrofuran (THF), N-methylpyrrolidinone, chloroform, methylene chloride, or other alkyl mono and polyhalides with a carbon chain length of, for example, from about 1 to about 20 carbon atoms, in embodiments from about 2 to about 10 carbon atoms. In some embodiments a solvent mixture may be utilized. Suitable solvent mixtures may include trifluoroacetic acid and an alkylene halide, such as methylene chloride or another alkyl mono or polyhalide as described above. Where a solvent mixture is utilized, the ratio of trifluoroacetic acid to the second solvent may range from about 1:10 parts by volume to about 10:1 parts by volume, in embodiments from about 4:6 parts by volume to about 8:2 parts by volume. In embodiments, the ratio of trifluoroacetic acid to the second solvent may be about 1:4 parts by volume.

The resulting phthalocyanine solution may be held at a suitable temperature from about −25° C. to about 100° C., in embodiments from about −10° C. to about 50° C., in embodiments from about 40° C. to about 45° C., for a period of time ranging from about 10 minutes to about 24 hours, in embodiments from about 30 minutes to about 12 hours, in embodiments for about 2 hours to allow formation of the co-crystal pigment of the present disclosure.

The co-crystal pigment of the present disclosure forms during the solubilization of the titanyl phthalocyanine and the metal free phthalocyanine, permitting the metal free phthalocyanine to substitute into the crystal lattice of the titanyl phthalocyanine thereby forming the co-crystal of the present disclosure. Without wishing to be bound by any theory, it is believed the co-crystal formed by the introduction of the metal free phthalocyanine into the crystal lattice of the titanyl phthalocyanine stabilizes the resulting co-crystal.

After the solubilization of the titanyl phthalocyanine and the metal free phthalocyanine, the phthalocyanine solution may be filtered or added to a nonsolvent that will precipitate the desired phthalocyanine co-crystal pigment. The nonsolvent to which the co-crystal pigment is added can include an alcohol such as methanol, ethanol, or isopropanol; water; an alkylene halide; such as methylene chloride; ketones such as acetone 1,1-dichloroethane, or combinations thereof. In some particularly useful embodiments, a mixture of methanol and methylene chloride may be utilized as the nonsolvent to precipitate the co-crystal pigment, at a ratio of methanol to methylene chloride ranging from about 95:5 to about 5:95, in embodiments from about 70:30 to about 30:70 parts by volume.

The ratio of solvent to nonsolvent may range from about 10:90 to about 90:10 by volume, in embodiments from about 25:75 to about 75:25 by volume.

The precipitate is then separated from any residual nonsolvent by suitable means, such as suction filtration, and the co-crystal pigment obtained may then be washed with, for example, water, methanol, or acetone followed by additional washing with methanol, deionized water, and the like. In some embodiments, the co-crystal pigment may be first washed with hot deionized water in separate washes, ranging from about 1 to about 5 washes, in embodiments from about 2 to about 4 washes, followed by washing in hot methanol in separate washes, in embodiments from about 1 to about 3 washes.

Optionally, the co-crystal pigment may be subjected to an additional filtration step, such as suction filtration, and then subjected to a conversion step whereby the phthalocyanine co-crystal from the precipitate is converted to a new form of polymorph. In the conversion step, the co-crystal pigment is added to an aromatic solvent. Examples of suitable aromatic solvents which may be utilized in the conversion step include aromatic hydrocarbons such as benzene, toluene, and xylene; aromatic nitro compounds such as nitrobenzene; aromatic halogen compounds such as monochlorobenzene, dichlorobenzene, trichlorobenzene and chloronaphthane; and phenol. The amount of the solvent to be used in the conversion process can range from about 1 times to about 100 times the weight of the phthalocyanine co-crystals to be treated, in embodiments from about 5 times to about 50 times the weight of the phthalocyanine co-crystals to be treated.

In embodiments the aromatic solvent may be combined with an alcohol solvent. Examples of suitable alcohol solvents are those having up to about 8 carbon atoms such as methanol and ethanol. Where a mixed solvent is utilized, the aromatic solvent/alcohol solvent volume ratio may range from about 99:1 to 1:99, in embodiments from about 90:10 to about 30:70.

The conversion step may take place for varying amounts of time ranging from about 1 hour to about 7 hours, in embodiments from about 2 hours to about 6 hours, in embodiments from about 3 hours to about 5 hours.

After the conversion treatment, the phthalocyanine co-crystals may be collected by filtration and may be subjected to a washing step as described above with, for example, deionized water or acetone, and vacuum dried to obtain the desired phthalocyanine co-crystals.

The resulting phthalocyanine co-crystals may be subjected to an additional drying step by, for example, heating at effective temperatures of, for example, from about 50° C. to about 90° C., in embodiments from about 60° C. to about 80° C., yielding a phthalocyanine co-crystal pigment.

The weight ratio of metal phthalocyanine to metal free phthalocyanine in the resulting phthalocyanine co-crystal ranges from about 99:1 to about 10:90, in embodiments from about 95:5 to about 50:50.

In an embodiment, a process for the preparation of co-crystals of metal phthalocyanine and metal free phthalocyanine ($H_2PC$) includes the solubilization of metal phthalocyanine and metal free phthalocyanine in a mixture of trifluoroacetic acid and methylene chloride; precipitation of the desired phthalocyanine co-crystals or separation by, for example, filtration, and optionally subjecting the product mixture to washing; followed by conversion in an aromatic solvent such as monochlorobenzene; and then subjecting the phthalocyanine co-crystals to additional optional filtration and washing steps. In some embodiments, the metal phthalocyanine may be a titanyl phthalocyanine, such as an α titanyl phthalocyanine and the metal free phthalocyanine may be the X-form of the metal free phthalocyanine.

The phthalocyanine co-crystals obtained by the methods of the present disclosure can be identified by various known means including X-ray powder diffraction (XRPD) with commercially available equipment, including a Siemens D5000 x-ray diffractometer. Peaks for metal/metal free phthalocyanine co-crystals may be found at 7.6, 9.5, 16.4, 23.5, and 27.4 degrees 2Θ (2 theta±0.2°) in the X-ray diffraction spectrum. Peaks for titanyl/metal free phthalocyanines (95%/5%) may be found at 7.6°, 9.5°, 9.8°, 11.8°, 13.4°, 14.3°, 14.9°, 16.4°, 18.2°, 22.5°, 23.5°, 24.2°, 25.4°, 27.4°, 28.7° degrees 2Θ (2 theta±0.2°) in the X-ray diffraction spectrum.

Once obtained, the phthalocyanine co-crystals of the present disclosure may be combined with a binder resin to form a dispersion suitable for forming a charge generation layer of a photoreceptor. Any suitable film forming polymer or combination of film forming polymers can be utilized as the binder resin to form the dispersion utilized to form the charge generation layer. Examples of suitable binder resins for use in preparing the dispersion include thermoplastic and thermosetting resins such as polycarbonates, vinylchloride and vinyl acetate copolymers, polyesters including polyethylene terephthalate, and the like. These polymers may be block, random, or alternating copolymers.

Examples of suitable polycarbonates which may be utilized to form the dispersion utilized to form the charge generation layer include, but are not limited to, poly(4,4'-isopropylidene diphenyl carbonate) (also referred to as bisphenol A polycarbonate), poly(4,4'-diphenyl-1,1'-cyclohexane carbonate) (also referred to as bisphenol Z polycarbonate, polycarbonate Z, or PCZ), poly(4,4'-sulfonyl diphenyl carbonate) (also referred to as bisphenol S polycarbonate), poly(4,4'-ethylidene diphenyl carbonate) (also referred to as bisphenol E polycarbonate), poly(4,4'-methylidene diphenyl carbonate) (also referred to as bisphenol F polycarbonate), poly(4,4'-(1,3-phenylenediisopropylidene)diphenyl carbonate) (also referred to as bisphenol M polycarbonate), poly(4,4'-(1,4-phenylenediisopropylidene) diphenyl carbonate) (also referred to as bisphenol P polycarbonate), and poly(4,4'-hexafluoroisppropylidene diphenyl carbonate).

Examples of suitable vinyl chlorides and vinyl acetates which may be utilized to form the dispersion utilized to form the charge generation layer include, but are not limited to, carboxyl-modified vinyl chloride/vinyl acetate copolymers such as VMCH (available from Dow Chemical) and hydroxyl-modified vinyl chloride/vinyl acetate copolymers such as VAGF (available from Dow Chemical).

The molecular weight of the binder resin used to form the charge generation layer may range from about 1000 to about 10000, in embodiments from 3000 to about 9000.

The binder resin is combined with the co-crystal pigment of the present disclosure to form the dispersion utilized to form the charge generation layer. In some embodiments, a single binder resin may be utilized to form a dispersion of the present disclosure. In other embodiments, a mixture of more than one of the above binder resins can be used to form a dispersion of the present disclosure. Where more than one binder resin is utilized, the number of binder resins can range from about 2 to about 5, in embodiments from about 2 to about 3.

The binder resin may be present in the dispersion utilized to form a charge generation layer in an amount ranging, for example, from about 20 percent to about 95 percent by weight of the dispersion and, in an embodiment, from about 25 percent to about 75 percent by weight of the dispersion, although the relative amounts can be outside these ranges.

The co-crystal pigment may be present in the dispersion in any suitable or desired amounts such that the resulting charge generation layer prepared therefrom possesses the desired level of pigment. In embodiments, the co-crystal pigment may be present in the dispersion, and thus the charge generation layer, in an amount ranging, for example, from about 5 percent to about 80 percent by weight of the dispersion and, in an embodiment, from about 25 percent to about 75 percent by weight of the dispersion.

It may be desirable to utilize a solvent in preparing the dispersion utilized to form the charge generation layer. The binder resin may be added to the solvent to form a solution and the co-crystal pigment may then be added to the solution. The solvent utilized should not substantially disturb or adversely affect other layers previously deposited on the photoreceptor, if any, nor should it disturb the phthalocyanine co-crystal pigment of the present disclosure. Examples of solvents that can be utilized in preparing the charge generation layer include, but are not limited to, ketones, alcohols, aromatic hydrocarbons, halogenated aliphatic hydrocarbons, ethers, amines, amides, esters, mixtures thereof, and the like. Specific illustrative examples include cyclohexanone, acetone, methyl ethyl ketone, methanol, ethanol, butanol, amyl alcohol, toluene, xylene, monochlorobenzene, carbon tetrachloride, chloroform, methylene chloride, trichloroethylene, tetrahydrofuran, dioxane, diethyl ether, dimethyl formamide, dimethyl acetamide, butyl acetate, ethyl acetate, methoxyethyl acetate, mixtures thereof, and the like.

Any suitable technique may be utilized to disperse the phthalocyanine co-crystals in the binder resin or resins. The dispersion containing the phthalocyanine co-crystals may be formed using, for example, attritors, ball mills, Dynomills, paint shakers, homogenizers, microfluidizers, mechanical stirrers, in-line mixers, or by any other suitable milling techniques.

In an embodiment, dispersion techniques which may be utilized include, for example, ball milling, roll milling, milling in vertical or horizontal attritors, sand milling, and the like. The solids content of the mixture being milled can be selected from a wide range of concentrations. Typical milling times using a ball roll mill may be between about 4 and about 6 days. If desired, the phthalocyanine co-crystals with or without binder resin may be milled in the absence of a solvent prior to forming the final coating dispersion.

In an embodiment, a solvent may be added to a dispersion of the present disclosure after it has been prepared to adjust the weight % of pigment therein. The process of diluting an initially formed dispersion, sometimes referred to herein as a millbase, to obtain the desired amount of pigment for formation of a charge generation layer is sometimes referred to herein as "let down". In an embodiment, a solvent described above may be utilized to let down the millbase to obtain the desired ratio of pigment to binder resin.

Any suitable and conventional technique may be utilized to apply the dispersion of the present disclosure to form a charge generation layer on another layer of a photoreceptor. Typical coating techniques include dip coating, roll coating, spray coating, rotary atomizers, and the like. The coating techniques may use a wide concentration of solids. The solids content may range from about 2 percent by weight to about 50 percent by weight based on the total weight of the dispersion, in embodiments from about 3.5 percent by weight to about 7 percent by weight based on the total weight of the dispersion. The expression "solids" refers to the pigment particle and binder components of the coating dispersion. These solids concentrations are useful in dip coating, roll coating, extrusion, spray coating, and the like. Generally, a more concentrated coating dispersion may be used for roll coating.

The charge generation layer containing the co-crystal pigments of the present disclosure and the resinous binder material generally ranges in thickness from about 0.05 µm to about 5 µm, in embodiments from about 0.1 µm to about 1 µm, although the thickness can be outside these ranges. The charge generation layer thickness is related to the relative amounts of co-crystal pigment and binder, with the co-crystal pigment often being present in amounts ranging from about 5 to about 80 percent by weight, in embodiments from about 45 to about 70 percent by weight. Higher binder content compositions generally require thicker layers for photogeneration. Generally, it may be desirable to provide this layer in a thickness sufficient to absorb about 90 percent or more of the incident radiation which is directed upon it in the imagewise or printing exposure step. The maximum thickness of this layer depends upon factors such as mechanical considerations, the thicknesses of the other layers, and whether a flexible photoconductive imaging member is desired.

The dispersions of the present disclosure may be utilized to form charge generation layers in conjunction with any known configuration for photoreceptors, including single and multi-layer photoreceptors. Examples of multi-layer photoreceptors include those described in U.S. Pat. Nos. 6,800,411, 6,824,940, 6,818,366, 6,790,573, and U.S. Patent Application Publication No. 20040115546, the entire disclosures of each of which are incorporated by reference herein. Photoreceptors may possess a charge generation layer (CGL), also referred to herein as a photogenerating layer, and a charge transport layer (CTL). Other layers, including a substrate, an electrically conductive layer, a charge blocking or hole blocking layer, an adhesive layer, and/or an overcoat layer, may also be present in the photoreceptor.

Suitable substrates which may be utilized in forming a photoreceptor may be opaque or substantially transparent, and may include any suitable organic or inorganic material having the requisite mechanical properties for use as a substrate. The substrate may be flexible, seamless, or rigid and may be of a number of different configurations such as, for example, a plate, a cylindrical drum, a scroll, an endless flexible belt, and the like.

The thickness of the substrate layer may depend on numerous factors, including mechanical performance and economic considerations. For rigid substrates, the thickness of the substrate can range from about 3 millimeters to about 10 millimeters, in embodiments from about 4 millimeters to about 8 millimeters. For flexible substrates, the substrate thickness can range from about 65 to about 150 micrometers, in embodiments from about 75 to about 100 micrometers, for optimum flexibility and minimum stretch when cycled around small diameter rollers of, for example, 19 millimeter diameter. The entire substrate can be made of an electrically conductive material, or the electrically conductive material can be a coating on a polymeric substrate.

Substrate layers selected for the imaging members of the present disclosure, and which substrates can be opaque or substantially transparent, may include a layer of insulating material including inorganic or organic polymeric materials such as MYLAR® (a commercially available polymer from DuPont), MYLAR® containing titanium, a layer of an organic or inorganic material having a semiconductive surface layer, such as indium tin oxide or aluminum arranged thereon, or a conductive material inclusive of aluminum, chromium, nickel, brass, or the like.

Any suitable electrically conductive material can be employed with the substrate. Suitable electrically conductive materials include copper, brass, nickel, zinc, chromium, stainless steel, conductive plastics and rubbers, aluminum, semi-transparent aluminum, steel, cadmium, silver, gold, zirconium, niobium, tantalum, vanadium, hafnium, titanium, nickel, chromium, tungsten, molybdenum, paper rendered conductive by the inclusion of a suitable material therein, or through conditioning in a humid atmosphere to ensure the presence of sufficient water content to render the material conductive, indium, tin, metal oxides, including tin oxide and indium tin oxide, and the like.

After formation of an electrically conductive surface, a hole blocking layer may optionally be applied to the substrate layer. Examples of components in the hole blocking layer include a metal oxide, such as titanium oxide or zinc oxide, a metal alkyloxide, such as a metal propoxide like titanium isoproxide (TIP), zirconium isoproxide, titanium methoxide, titanium butoxide, zirconium butoxide, titanium ethoxide, and the like; a silane, such as an alkylalkoxysilane like 3-aminopropyltrimethoxysilane (APS), 3-aminopropyltriethoxysilane, 3-aminopropyl diisopropylethoxysilane, 3-aminopropylmethyl diethoxysilane or 3-aminopropylpentamethyldisiloxane, and the like, such as an aminophenyltrimethoxysilane; a thermosetting resin of phenolic resin, a polymer of polymethylmethacrylate (PMMA), polyvinyl butyral (PVB), and mixtures thereof; polyvinyl alcohol, poly(hydroxyethyl methacrylate), poly(hydroxypropyl acrylate) and poly(vinylpyrrolidone); a copolymer like a vinyl halide, especially a vinyl chloride copolymer like poly(vinyl chloride-co-vinyl acetate), poly(vinyl chloride-co-vinyl acetate-co-vinyl alcohol), poly(vinylidene chloride-co-methyl acrylate) or poly(vinyl chloride-co-isobutyl vinyl ether), and the like, and wherein the solvent selected for the coating solution is a suitable organic solvent like methylethyl ketone (MEK), tetrahydrofuran (THF), toluene, an alcohol like 1-propanol, ethanol, 1-butanol, and acetone. In embodiments, the amounts of components present in the final composition can be, for example, metal alkyloxide, such as titanium isopropoxide, of from about 5 percent to about 95, and more specifically, from about 20 percent to about 80 percent; the silane, such as 3-aminopropyltrimethoxysilane, of from about 95 percent to about 5 percent, and in embodiments, from about 80 percent to about 20 percent; the binder polymer, such as PVB, of from about 1 percent to about 99 percent, and in embodiments, from about 5 percent to about 70 percent; the solvent, for example, from about 5 to about 95 weight percent, and in embodiments, from about 15 to about 80 percent.

The blocking layer may be continuous and have a thickness of from about 0.01 micrometers to about 30 micrometers, in embodiments from about 0.1 micrometers to about 8 micrometers.

An optional adhesive layer may be applied to the hole blocking layer. Any suitable adhesive layer may be utilized including, but not limited to, polyesters, polyamides, poly(vinyl butyral), poly(vinyl alcohol), polyurethane and polyacrylonitrile. Where present, the adhesive layer may be, for example, of a thickness of from about 0.001 micrometers to about 1 micrometer. Optionally, the adhesive layer may contain effective suitable amounts, for example from about 1 weight percent to about 10 weight percent, of conductive and nonconductive particles, such as zinc oxide, titanium dioxide, silicon nitride, carbon black, and the like, to provide further desirable electrical and optical properties to the photoreceptor of the present disclosure. Conventional techniques for applying an adhesive layer coating mixture to the hole blocking layer include spraying, dip coating, roll coating, wire wound rod coating, gravure coating, die coating and the like. Drying of the deposited coating may be effected by any suitable conventional technique such as oven drying, infrared radiation drying, air drying and the like.

In embodiments the photoreceptor also includes a charge transport layer attached to the charge generation layer. The charge transport layer may include a charge transport or hole transport molecule (HTM) dispersed in an inactive polymeric material. These compounds may be added to polymeric materials which are otherwise incapable of supporting the injection of photogenerated holes from the charge generation layer and incapable of allowing the transport of these holes therethrough. The addition of these HTMs converts the electrically inactive polymeric material to a material capable of supporting the direction of photogenerated holes from the charge generation layer and capable of allowing the transport of these holes through the charge transport layer in order to discharge the surface charge on the charge transport layer.

Suitable polymers for use in forming the charge transport layer include those polymers utilized to form the charge generation layer. In embodiments the resin materials for use in forming the charge transport layer are electrically inactive resins including polycarbonate resins having a weight average molecular weight from about 20,000 to about 150,000, in embodiments from about 50,000 about 120,000. Electrically inactive resin materials which may be utilized in the charge transport layer include poly(4,4'-dipropylidene-diphenylene carbonate) with a weight average molecular weight of from about 35,000 to about 40,000, available as LEXAN® 145 from General Electric Company; poly(4,4'-propylidene-diphenylene carbonate) with a weight average molecular weight of from about 40,000 to about 45,000, available as LEXAN® 141 from the General Electric Company; a polycarbonate resin having a weight average molecular weight of from about 50,000 to about 100,000, available as MAKROLON® from Farbenfabricken Bayer A.G.; and a polycarbonate resin having a weight average molecular weight of from about 20,000 to about 50,000 available as MERLON® from Mobay Chemical Company. Methylene chloride solvent may be utilized in forming the charge transport layer coating mixture.

Any suitable charge transporting or electrically active molecules known to those skilled in the art may be employed as HTMs in forming a charge transport layer on a photoreceptor. Suitable charge transporting molecules include, for example, aryl amines as disclosed in U.S. Pat. No. 4,265, 990, the entire disclosure of which is incorporated by reference herein. In embodiments, an aryl amine charge hole transporting component may be represented by:

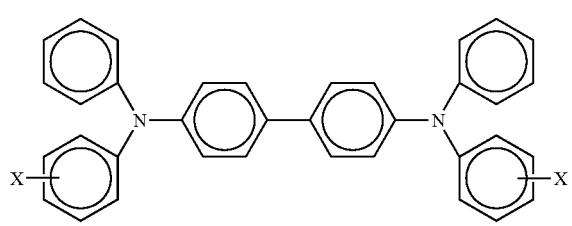

wherein X is selected from the group consisting of alkyl, halogen, alkoxy, or mixtures thereof. Typically, the halogen is a chloride. The alkyl group may contain, for example, from about 1 to about 10 carbon atoms and, in embodiments from about 1 to about 5 carbon atoms. Examples of suitable aryl amines include, but are not limited to, N,N'-diphenyl-N,N'-bis(alkylphenyl)-1,1-biphenyl-4,4'-diamine, wherein the alkyl may be methyl, ethyl, propyl, butyl, hexyl, and the like; and N,N'-diphenyl-N,N'-bis(halophenyl)-1,1'-biphenyl-4,4'-diamine, wherein the halo may be a chloro, bromo, fluoro and the like substituent.

Other suitable aryl amines which may be utilized as an HTM in a charge transport layer include, but are not limited to, tritolylamine, N,N'-bis(3,4 dimethylphenyl)-N"(1-biphenyl)amine, 2-bis((4'-methylphenyl)amino-p-phenyl) 1,1-diphenyl ethylene, 1-bisphenyl-diphenylamino-1-propene, triphenylmethane, bis(4-diethylamine-2-methylphenyl)phenylmethane, 4'-4"-bis(diethylamino)-2',2"-dimethyltriphenylmethane, N,N'-bis(alkylphenyl)-[1,1'-biphenyl]-4,4'-diamine wherein the alkyl is, for example, methyl, ethyl, propyl, n-butyl, and the like, N,N'-diphenyl-N,N'-bis(3"-methylphenyl)-(1,1'-biphenyl)-4,4'-diamine, and the like.

The weight ratio of the polymer binder to charge transport molecules in the resulting charge transport layer can range, for example, from about 80/20 to about 30/70. In embodiments the weight ratio of the polymer binder to charge transport molecules can range from about 40/60 to about 75/25, in embodiments from about 50/50 to about 60/40.

Any suitable and conventional technique may be utilized to mix the polymer binder in combination with the hole transport material and apply same as a charge transport layer to a photoreceptor. In embodiments, it may be advantageous to add the polymer binder and hole transport material to a solvent to aid in formation of a charge transport layer and its application to a photoreceptor. Examples of solvents which may be utilized include aromatic hydrocarbons, aliphatic hydrocarbons, halogenated hydrocarbons, ethers, amides and the like, or mixtures thereof. In embodiments, a solvent such as cyclohexanone, cyclohexane, chlorobenzene, carbon tetrachloride, chloroform, methylene chloride, trichloroethylene, tetrahydrofuran, dioxane, dimethyl formamide, dimethyl acetamide and the like, may be utilized in various amounts, such as from about 50 milliliters to about 1,000 milliliters. Typical application techniques of the charge transport layer include spraying, dip coating, roll coating, wire wound rod coating, and the like. Drying of the deposited coating may be effected by any suitable conventional technique such as oven drying, infrared radiation drying, air drying and the like.

Generally, the thickness of the charge transport layer can range from about 2 to about 50 micrometers, in embodiments from about 15 to about 35 micrometers, but thicknesses outside this range can also be used. The charge transport layer should be an insulator to the extent that the electrostatic charge placed on the charge transport layer is not conducted in the absence of illumination at a rate sufficient to prevent formation and retention of an electrostatic latent image thereon. In general, the ratio of the thickness of the charge transport layer to the charge generation layer, where present, is from about 2:1 to 200:1 and in some instances as great as 400:1.

Where the charge generation layer is to be part of a multi-layered photoreceptor, the resulting dispersion may be applied to the adhesive layer, a suitable electrically conductive layer, or to a charge transport layer. When used in combination with a charge transport layer, the charge generation layer may be sandwiched between a conductive surface and a charge transport layer or the charge transport layer may be sandwiched between a conductive surface and a charge generation layer.

Where present in a photoreceptor, the charge generation layer, charge transport layer, and other layers may be applied in any suitable order to produce either positive or negative charging photoreceptors. For example, the charge generation layer may be applied prior to the charge transport layer, as illustrated in U.S. Pat. No. 4,265,990, or the charge transport layer may be applied prior to the charge generation layer, as illustrated in U.S. Pat. No. 4,346,158, the entire disclosures of each of which are incorporated by reference herein.

Optionally, an overcoat layer may be applied to the surface of a photoreceptor to improve resistance to abrasion. In some cases, an anti-curl back coating may be applied to the side of the substrate opposite the active layers of the photoreceptor (i.e., the CGL and CTL) to provide flatness and/or abrasion resistance where a web configuration photoreceptor is fabricated. These overcoating and anti-curl back coating layers are well known and may include thermoplastic organic polymers or inorganic polymers that are electrically insulating or slightly semi-conductive. Overcoatings may be continuous and have a thickness ranging from about 0.5 to about 10 micrometers, in embodiments from about 1 to about 3 micrometers. An example of an anti-curl backing layer is described in U.S. Pat. No. 4,654,284, the entire disclosure of which is incorporated herein by reference. In embodiments, it may be desirable to coat the back of the substrate with an anticurl layer such as, for example, polycarbonate materials commercially available as MAKROLON® from Bayer MaterialScience. The thickness of anti-curl backing layers should be sufficient to substantially balance the total forces of the layer or layers on the opposite side of the supporting substrate layer. A thickness for an anti-curl backing layer may range, for example, from about 70 and about 160 micrometers, in embodiments from about 100 to about 120 micrometers.

The sensitivity of a photoreceptor possessing a charge generation layer prepared with the co-crystal pigment of the present disclosure may range in sensitivity from about 200 $Vcm^2$/ergs to about 620 $Vcm^2$/ergs, in embodiments from about 400 $Vcm^2$/ergs to about 520 $Vcm^2$/ergs.

Processes of imaging, especially xerographic imaging and printing, are also encompassed by the present disclosure. More specifically, photoreceptors of the present disclosure can be selected for a number of different known imaging and printing processes including, for example, electrophotographic imaging processes, especially xerographic imaging and printing processes wherein charged latent images are rendered visible with toner compositions of an appropriate charge polarity. In embodiments, the imaging members may be sensitive in the wavelength region of, for example, from about 500 to about 900 nanometers, in embodiments from about 650 to about 850 nanometers; thus diode lasers can be selected as the light source. Moreover, the imaging members of this disclosure may be useful in color xerographic applications, particularly high-speed color copying and printing processes.

The following Examples are being submitted to illustrate embodiments of the present disclosure. These Examples are intended to be illustrative only and are not intended to limit the scope of the present disclosure. Also, parts and percentages are by weight unless otherwise indicated.

EXAMPLE 1

A co-crystal pigment of the present disclosure was prepared by dissolving 9.5 grams of crude TiOPC (which exhibited α-like properties) and 0.5 grams of the X-form of $H_2PC$ in 150 grams of a mixed solvent of trifluoroacetic acid and methylene chloride ($CF_3COOH/CH_2CH_2Cl_2$) at 40–45° C. for about 2 hours. The solution was slowly quenched in 500 grams of a mixed solvent of methanol and methylene chloride, and after suction filtration, the pigment was washed three times with hot deionized water at a temperature of about 75–90° C. and two times with hot methanol at a temperature of about 40–50° C. After suction filtration overnight, the pigment was converted in 78 grams of monochlorobenzene (MCB) for about 4 hours, after which the material was filtered and vacuum dried for about 18 to about 20 hours.

The resulting co-crystal pigment was evaluated and tested on an organic photoconductor (OPC) drum photoreceptor. The photoreceptor device possessed a zirconium silane undercoat layer having acetylacetonate tributoxy zirconium, (aminopropyl)trimethoxysilane and polyvinyl butyral, over which was applied a charge generating layer made of the above co-crystal pigment in a vinyl chloride/vinyl acetate binder resin, and over the charge generating layer was a charge transporting layer of N,N'-diphenyl-N,N'-bis(alkylphenyl)-1,1-biphenyl-4,4'-diamine and polycarbonate. The undercoat layer on all devices was about 1.1. µm in thickness, the charge generating layer on all devices was about 0.25 µm in thickness, and the charge transporting layer on all devices was ~25 µm in thickness.

An X-ray diffraction spectrum was obtained for the resulting material utilizing a Siemens D5000 x-ray diffractometer. Peaks for the resulting titanyl/metal free phthalocyanine (95%/5%) were observed at 7.6°, 9.5°, 9.8°, 11.8°, 13.4°, 14.3°, 14.9°, 16.4°, 18.2°, 22.5°, 23.5°, 24.2°, 25.4°, 27.4°, 28.7° degrees 2Θ (2 theta±0.2°) in the X-ray diffraction spectrum.

Additional photoreceptor devices having the same configuration and components, but utilizing HOGaPC as the pigment, or TiOPC as the pigment, were prepared for comparison. Photoinduced discharged characteristics (PIDC) of the devices having the TiOPC/H2PC co-crystal as the pigment, HOGaPC as the pigment, and TiOPC as the pigment were obtained by an electric scanner set to obtain 100 charge-erase cycles immediately followed by an additional 100 cycles, and sequences at 2 charge-erase cycles and 1 charge-expose-erase cycle, wherein the light intensity was incrementally increased with cycling to produce a photoinduced discharge curve from which the photosensitivity was measured. The exposure light intensity was incrementally increased by means of regulating a series of neutral density filters, and the exposure wavelength was controlled by a bandfilter at 780±5 nanometers. The exposure light source was 1000 watt Xenon arc lamp white light source. The devices were rotated at a speed of 61 rpm. The entire xerographic simulation was carried out in an environmentally controlled light tight chamber at ambient conditions (50 percent relative humidity and 22° C.). The results of these tests are shown in FIG. 1. The device generated with the co-crystal pigment of the present disclosure was more sensitive than the device having HOGaPC as the pigment, and only slightly less sensitive than the device having TiOPC as the pigment. Table 1 below summarizes the photoelectrical properties of these devices.

TABLE 1

Key Photoelectrical Properties of TiOPC/H$_2$PC and comparative devices. All devices about 25 µm in dielectric thickness.

| Device | dV/dX (Vcm$^2$/ergs) | V$_L$(1.0 ergs) | V$_{dep}$ |
|---|---|---|---|
| TiOPC/H$_2$PC co-crystal | 480 | 280 | 100 |
| HOGaPC | 348 | 400 | 70 |
| TiOPC | 520 | 250 | 65 |

Figure 2:
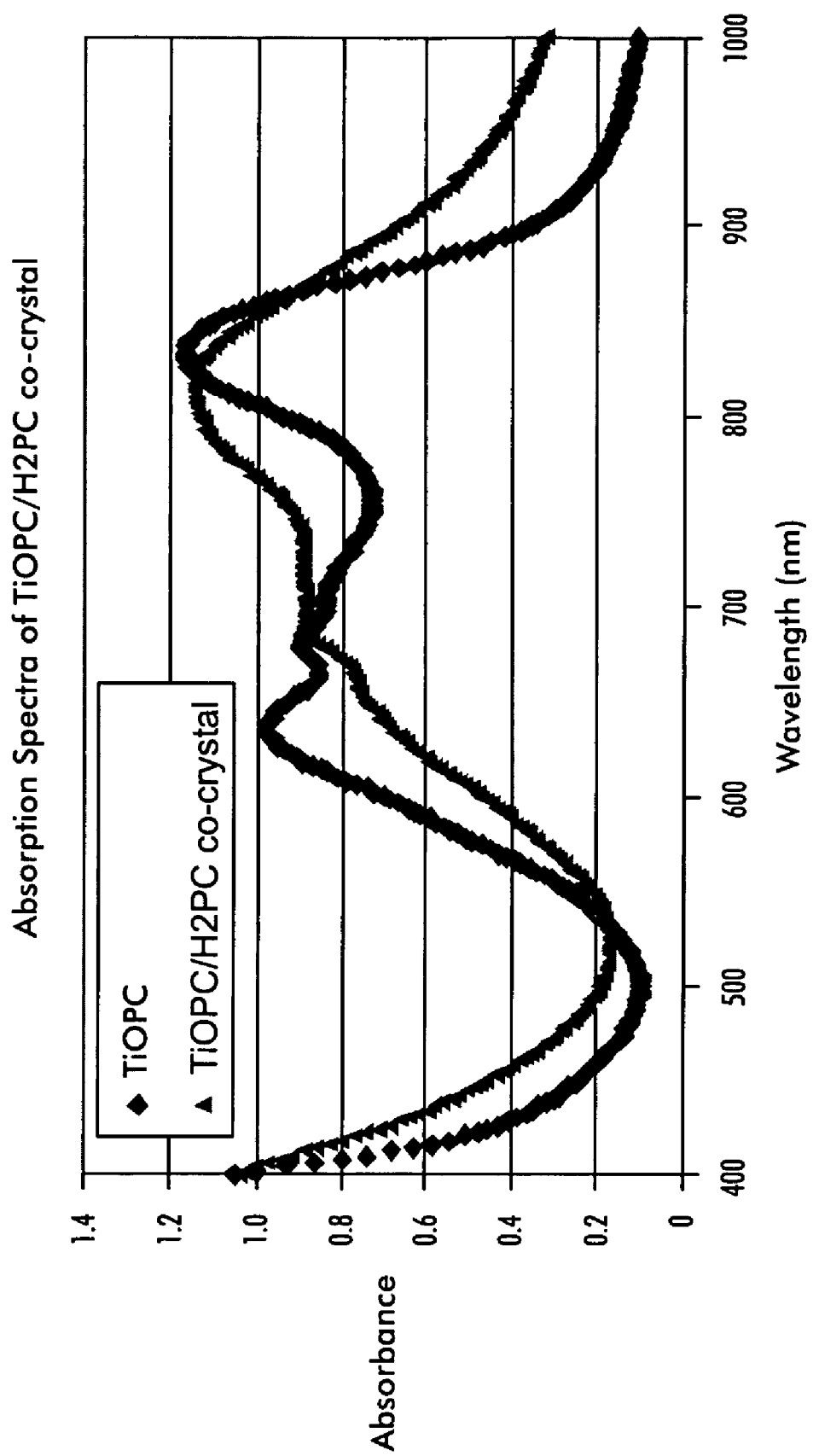
FIG. 2 is a graph depicting the absorption spectra of TiOPC/$H_2$PC phthalocyanine co-crystal pigment dispersions of the present disclosure compared with TiOPC pigment dispersions.

Absorption spectra of the TiOPC/H$_2$PC pigment co-crystal of the present disclosure in a dispersion and TiOPC containing dispersions were obtained by a UV-Vis spectrophotometer, the results of which are set forth in FIG. 2. As can be seen in FIG. 2, the Q-band feature of the TiOPC/H$_2$PC co-crystal pigment was quite distinct from the TiOPC pigment, suggesting a different polymorph. Note the oscillator strength of the π-E$_g$ transition (~600–650 nm) was lower for the TiOPC/H$_2$PC co-crystal than the TiOPC pigment, another indication of different stacking properties for the co-crystal.

The co-crystals of TiOPC and H$_2$PC of the present disclosure had excellent sensitivity and possessed a morphology different than TiOPC alone and/or H$_2$PC alone. The co-crystal of TiOPC and H$_2$PC produced herein had a unique absorption spectra and a sensitivity of about 500 Vcm$^2$/ergs at a dielectric thickness of about 25 µm. This sensitivity was only about 5–7.5% less than the most sensitive TiOPC, and more sensitive than HOGaPC.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method which comprises:
   contacting a metal phthalocyanine and a metal free phthalocyanine with at least one solvent; and
   recovering said phthalocyanine product as a cocrystalline complex of metal phthalocyanine and metal free phthalocyanine,
   wherein the weight ratio of metal phthalocyanine to metal free phthalocyanine is from about 99:1 to about 10:90.

2. The method of claim 1 wherein the metal phthalocyanine is selected from the group consisting of titanyl phthalocyanine, hydroxygallium phthalocyanine, cholorogallium phthalocyanine and zirconyl phthalocyanine.

3. The method of claim 1 wherein the metal phthalocyanine comprises titanyl phthalocyanine.

4. The method of claim 1 wherein the metal phthalocyanine comprises hydroxygallium phthalocyanine.

5. The method of claim 1 wherein the solvent is selected from the group consisting of protonic acids, aromatic solvents, ethers, pyrrolidinones, alkyl halides, alkylene halides, and mixtures thereof.

6. The method of claim 1 wherein the solvent is selected from the group consisting of trifluoroacetic acid, toluene, tetrahydrofuran, N-methylpyrrolidinone, chloroform, methylene chloride, and mixtures thereof.

7. The method of claim 1 wherein the solvent comprises a mixture of trifluoroacetic acid and methylene chloride, optionally at a ratio of from about 1:10 parts by volume to about 10:1 parts by volume.

8. The method of claim 1, further comprising adding the solution obtained subsequent to the mixing to a nonsolvent selected from the group consisting of alcohols, water, alkylene halides, ketones and mixtures thereof, wherein the nonsolvent enables the precipitation of the phthalocyanine cocrystalline complex.

9. The method of claim 8 wherein the nonsolvent comprises a mixture of methanol and methylene chloride.

10. The method of claim 1 wherein the phthalocyanine cocrystalline complex is separated from the solution by filtration.

11. The method of claim 1, further comprising converting the phthalocyanine cocrystalline complex to a photosensitive pigment by adding the phthalocyanine cocrystalline complex to an aromatic solvent selected from the group consisting of aromatic hydrocarbons, aromatic nitro compounds, aromatic halogen compounds, and phenols.

12. The method of claim 11 wherein the aromatic solvent further comprises an alcohol solvent.

13. A method for the preparation of phthalocyanine co-crystals which comprises:
   contacting a titanyl phthalocyanine and a metal free phthalocyanine to a solvent comprising trifluoroacetic acid and methylene chloride;
   contacting the resulting solution with a nonsolvent selected from the group consisting of selected from the group consisting of alcohols, water, alkylene halides, ketones and combinations thereof to precipitate the phthalocyanine co-crystals;
   contacting the precipitated co-crystal phthalocyanine with an aromatic solvent; and
   recovering the phthalocyanine co-crystals as a complex of titanyl phthalocyanine and metal free phthalocyanine.
   wherein the weight ratio of titanyl phthalocyanine to metal free phthalocyanine is from about 99:1 to about 10:90.

14. The method of claim 13 wherein the ratio of trifluoroacetic acid to methylene chloride ranges from about 1:10 parts by volume to about 10:1 parts by volume.

15. The method of claim 13 wherein the nonsolvent comprises a mixture of methanol and methylene chloride at a ratio ranging from about 95:5 parts by volume to about 5:95 parts by volume.

16. The method of claim 13 wherein the phthalocyanine co-crystal precipitated product is separated from the nonsolvent by filtration.

17. The method of claim 13, wherein the aromatic solvent is selected from the group consisting of aromatic hydrocarbons, aromatic nitro compounds, aromatic halogen compounds, and phenols.

18. The method of claim 13 wherein the aromatic solvent further comprises an alcohol solvent, at a ratio of aromatic solvent to alcohol solvent ranging from about 99:1 to about 1:99.

* * * * *